May 2, 1967  J. A. SIMPSON ETAL  3,316,661
VARIABLE CONSTANT-SPEED DRIVE MECHANISM
Filed April 29, 1965  2 Sheets-Sheet 1

Inventors:
John A. Simpson
Charles E. Soderquist, Jr.
By Leonard J. Wixen
Attorney

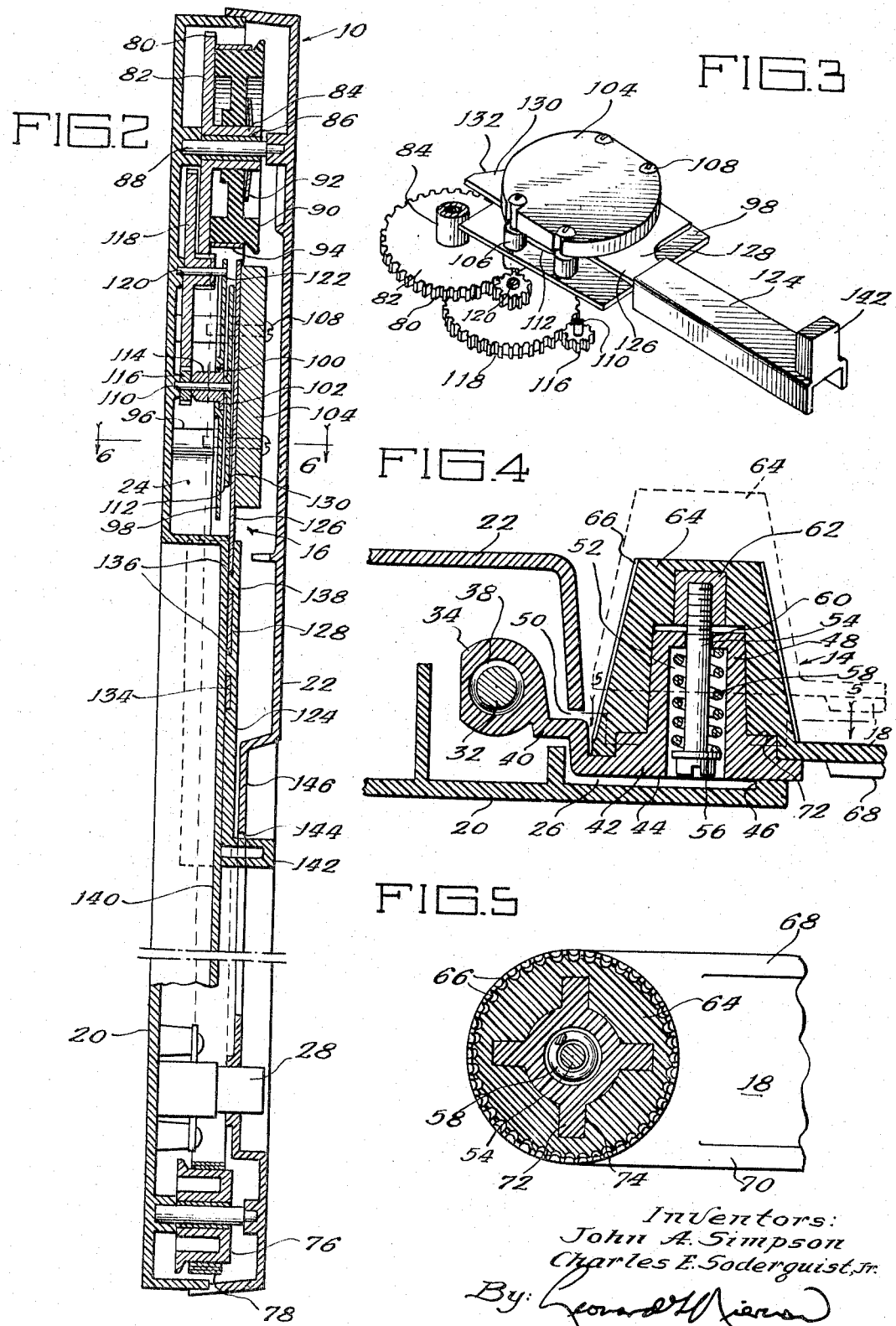

United States Patent Office 3,316,661
Patented May 2, 1967

3,316,661
VARIABLE CONSTANT-SPEED DRIVE MECHANISM
John A. Simpson, Chicago, and Charles E. Soderquist, Jr., Chicago Heights, Ill., assignors to Elizabeth A. Simpson, Chicago, Ill.
Filed Apr. 29, 1965, Ser. No. 451,888
7 Claims. (Cl. 35—35)

This invention relates to a drive mechanism for reading-teaching machines and similar purposes, and more particularly to a drive mechanism of the type employing a constant force producing a speed regulated by variation of an eddy-current brake.

In U.S. Patent 2,919,500 of Simpson, Sinila, and Soderquist, there is shown a reading-pacing device employing an eddy-current brake for speed regulation. In that device, a line-indicating member or shutter is driven downwardly over successive lines of printed or written material at a constant speed produced by a constant force spring, the motion of the shutter being retarded or controlled by an eddy-current brake. The braking force, and thus the speed, are there varied by changing the magnetic flux through the eddy-current brake.

The present invention has as its principal object the improvement of the general type of speed-regulating mechanism shown in the patent mentioned, from the standpoint of simplicity of construction and reliability and reproducibility of calibration. The improvements in the speed control effected by the invention, although of particular utility in connection with reading-pacing devices of the type mentioned, will be seen to be also useful in variable constant-speed drives for other purposes.

In general, the improvement and simplification of the present speed control is effected by altering the magnetic field through the eddy-current braking element to adjust the speed in a substantially different manner than that heretofore employed. In the earlier device, the magnetic field through the rotating conductor of the brake was altered in intensity, this being done by changing the length of distance of the flux path. This was done by moving the magnet toward and away from the disk, more or less in the direction of the axis of rotation of the disk. Because of the small distance employed for efficiency of braking with a relatively small permanent magnet, the speed in such an arrangement is found to be a highly critical function of small changes of spacing, thus requiring extremely fine tolerances in manufacturing and criticality of dimensioning in obtaining fully reproducible speed calibration in factory production, and also in maintaining calibration constant with wear, etc.

The present invention employs a completely different type of mechanism, permitting relatively gross motions of the adjustable element of the brake and thus minimizing all requirements of manufacturing tolerances while, at the same time, increasing, rather than decreasing, the precision and reproducibility of the controlled speed. In addition, the present construction permits the employment of calibration scales of any desired length, to permit ease of manual setting and reading without the introduction of gearing, camming, or similar provision of mechanism intervening between the manually manipulated adjustment part and the portion of the brake by which the adjustment is effected.

In the construction of the invention, the speed is altered by altering the area of the moving conductor of the eddy-current brake which is exposed to the magnetic field, rather than by varying the magnetic field itself. This is most advantageously done by the employment of a movable shield or shunt, interposed between the magnet and the rotating conductor, the shunt being moved through the gap between the magnet and the rotating conductor to shield variable portions of the conductor from the magnetic field, altering the area and shape of the magnetic field penetrating the disk.

The above general principle of construction will be seen to permit coverage of the speed range of the brake with relatively gross motion as compared to the small motions employed for control in the earlier device, without reduction of the total braking force achievable from any given size of magnet and disk. Indeed, because the present control permits extremely accurate spacing of the magnet from the disk by employment of permanent spacing members, the maximum braking force practically achievable with any given size of disk and magnet is substantially increased by the present construction from a practical standpoint.

As will be further seen hereinafter, the shunt or shield employed in the invention may readily be shaped to permit a length of stroke, between minimum and maximum braking force, greatly in excess of the dimensions of the disk itself. Thus the control may readily be designed to have a range of motion of any desired length. This is particularly advantageous in a reading-pacing device of the type mentioned above, or similar devices, in which the stroke of the adjusting device may be made to run parallel to the stroke or path of the driven member, so that no substantial addition to the space requirement is made by providing a long calibrated scale used in setting the speed.

Other features and advantages of the invention will become apparent from the description below of the embodiment thereof illustrated in the drawing in which:

FIGURE 2 is a longitudinal sectional view taken along the offset line 2—2 of FIGURE 1;

FIGURE 3 is a fragmentary more or less exploded view in isometric perspective of a portion of the device of FIGURE 1, comprising parts of a drive mechanism and speed-regulating assembly of the device;

FIGURE 4 is an enlarged sectional view of a portion of a shutter assembly of the device taken along the line 4—4 of FIGURE 1;

FIGURE 5 is a sectional view taken along the offset line 5—5 of FIGURE 4, in the direction indicated;

Figure 1:
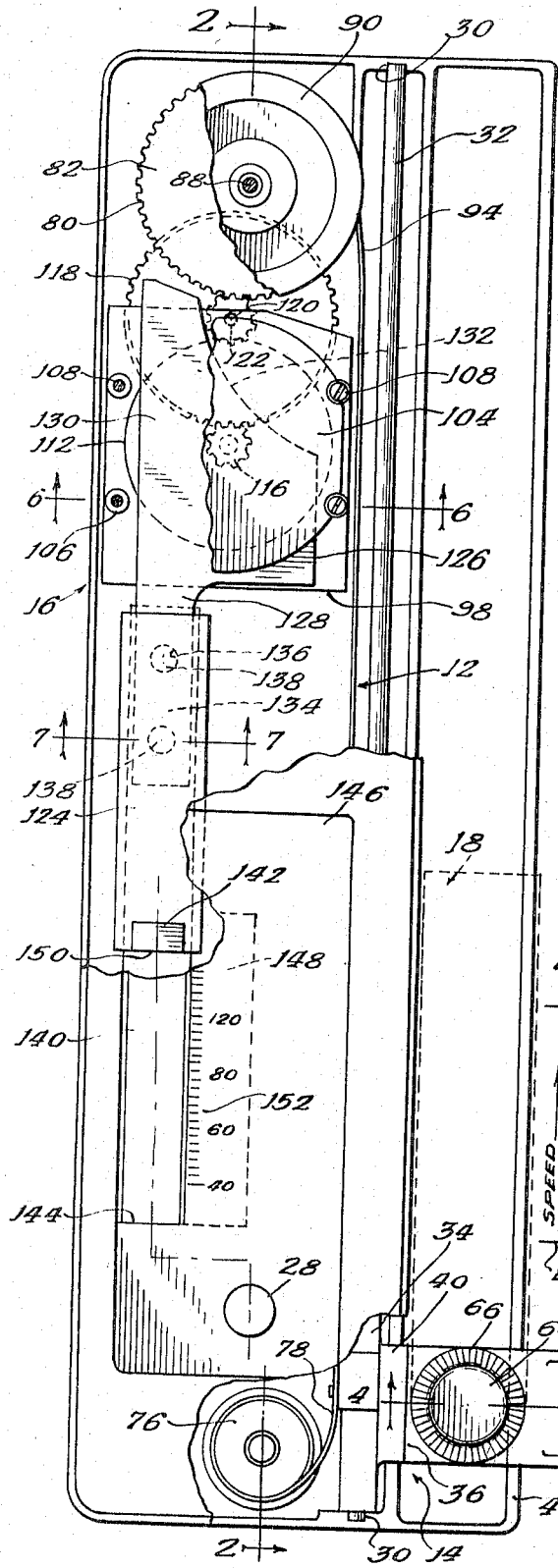
FIGURE 1 is a top plan view of a reading-training device made in accordance with the teachings of the invention, with a cover and certain other portions of the device partially broken away.
Figure 6:
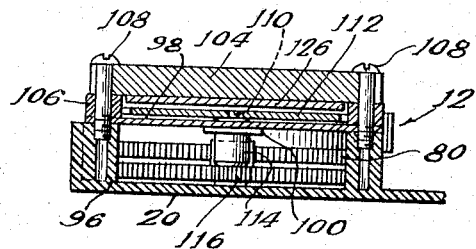
FIGURE 6 is a transverse sectional view taken along the line 6—6 of FIGURE 1.
Figure 7:
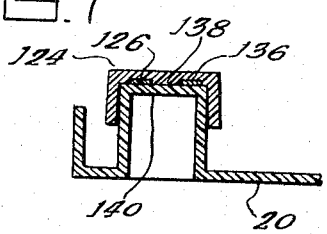
FIGURE 7 is a transverse sectional view taken along the line 7—7 of FIGURE 1.

Referring now to FIGURES 1 and 2 of the drawing it is seen that the reading-training device therein illustrated comprises a case 10 which bears a spring-and-pulley drive mechanism designated generally by the numeral 12, a collapsible or foldable shutter assembly 14 secured to the drive mechanism, and a speed regulating assembly 16.

The case 10 is generally rectangular in shape, being elongated vertically and adapted to be placed on the margin of a page of a book or other reading material, with the shutter 18 extending horizontally and being driven downwardly over successive lines of material, and comprises a mating base 20 and cover 22, preferably of high-impact plastic having studs, apertures, ribs, channels, and similar formations fabricated in the molding thereof.

Certain of these formations seen in the drawing will be recognized as reinforcing ribs and similar structure used, as is conventional in plastics technology, to impart strength with a minimum of materials, and are not further described herein. The covered portion 24 of the base 20 mounts the drive mechanism 12 and the speed-regulating assembly 16, and an extending portion 26 of the base 20 provides a sliding support for the shutter assembly 14.

A timer button assembly 28, seen in the drawing, is described in the copending application of John A Simpson filed on July 1, 1963, Ser. No. 291,887, now Patent Number 3,264,759, and will not be further described herein.

Mounted at its ends in recesses 30 at the top and bottom of the base is a guide or slide rod 32, on which is slideably mounted an apertured cylindrical slide portion 34 of the shutter carrier 36, with a suitable bearing liner 38.

Integral with the slide portion 34, and connected thereto by an offset portion 40, is a knob-seat portion 42 having a base plate 44 with a flat undersurface slideable along the top surface of a longitudinal rib 46 on the outer edge of the base and a frusto-conical stud 48. The joint between the base 20 and cover 22 is open on this edge to form a gap 50 passing the offset portion 40 of the shutter carrier. The knob-seat portion 42 has an upward central bore 52 containing an upwardly extending bolt 54, the head of which bears against a washer 56 to compress a surrounding helical spring 58 within the bore 52; the end of the bolt passes slideably through a reduced-diameter aperture 60 in the top of the stud and engages an internally threaded insert 62 in the head of a knob 64 fluted at 66 and of internal configuration mating with the stud.

The bottom end of the knob 64 bears an integral line-indicator or shutter 18, which is a rectangular plate formed, for mechanical strength, with bevel edges 68, the lower edge 70 being employed to indicate successive lines of adjacent printed material (not shown).

As best seen in FIGURES 4 and 5, the stud portion 48 of the carrier 36 has at the base 44 four equiangularly spaced teeth or keys 72 which engage cut-out keyways or slots 74 in the mating knob 64. The action of spring 58, compressed as previously described, maintains engagement of the keys 72 and slots 74 to prevent rotation; but when the knob is raised (shown dotted in FIGURE 4), thus disengaging the keyed engagement, it may be rotated. The shutter 18 may thus be selectively rotated to the horizontal position for use or to a vertical storage position (shown dotted in FIGURE 1), in which it substantially overlies the portion 26 of the base, the distance from the axis of the stud 48 to the edge of the base being approximately equal to the distance from this axis to the line-indicating edge. Thus the device is highly compact in its storage condition.

The spring drive mechanism 12 includes a pulley or spool 76 at the bottom end of the base, and a pre-stressed constant-force motor spring or tape 78 wound thereon and having its outer end secured to the carrier 36, as in the patent earlier mentioned, and the present embodiment also has further resemblance to the devices of that patent in the use of an eddy-current brake for speed control, and in certain portions of the coupling between the brake and the shutter. But there are a number of improved features in the structure now to be described.

An upper pulley gear 80 comprising a gear wheel 82 and upwardly extending integral hub 84 is rotatably mounted about a sleeve bearing 86 on a fixed pin 88. An upper spool 90, formed of a hard rubber-like material such as that known commercially as Arcadia Compound #77152–C fits loosely around the hub 84 and is urged against the upper surface of the gear wheel 82 (which is sintered iron) by a spring fastener 92, such as the type known as a "Speed Nut," and as will be explained below, the spool is thus frictionally coupled to the gear. Wound on the spool 90 is a constant-force clutch spring or tape 94, the outer end of which is secured to the shutter carrier to form with the spring 78 a tension assembly bearing the shutter. As in the earlier patent, the force of the motor spring 78 is of course much greater than that of the clutch spring 94. The bulk of the length of the clutch spring 94 is pre-stressed to a radius smaller than the radius of the upper spool 90. However, at the inner end (i.e., the end which is upon the spool) the natural radius of curvature is gradually tapered from the smaller radius to a natural radius of curvature which is slightly larger than the radius of the spool. With this construction, there is obtained a type of one-way clutch action. As explained in U.S. Patent 2,919,500, when the shutter 18 is manually urged upwardly, the enlarged natural radius of the inner end of the tape prevents substantial friction with the spool, so that the tape 94 is readily decoupled from the spool 90. But when the shutter is moving downwardly, under the urging of the lower spring, the tape is tightened on the spool and is thus rigidly coupled thereto upon the commencement of pulling motion.

Mounted on the base 20 between the upper spool 90 and the lower spool 76 is a speed-regulating assembly 16. Seated upon four mounting lugs 96 near the upper spool 90 is a generally square, flat, ferromagnetic flux-return plate 98 having a recessed central region 100 centrally apertured at 102. A flat, generally circular multi-pole ceramic magnet 104 is fixedly mounted above the plate 98, being spaced therefrom by spacers 106, the assembly being secured to the lugs by self-tapping screws 108.

Between the magnet 104 and the plate 98, mounted on a rotatable shaft 110, is a flat, circular, conducting non-magnetic disk 112, preferably of copper. A bearing 114, in which the shaft 110 is rotatably mounted, has a flange portion seated in the plate recess 100 and extends downwardly through the central aperture 102. A pinion gear 116 is secured to the lower end of the shaft 110. The small pinion gear 116 is coupled to gear wheel 82 by an intermediate gear 118 to produce fast rotation of the disk 112 with the relatively slow rotation of the upper spool 90, the intermediate gear 118 being on a shaft 120 rotatably mounted in a base boss and in an aperture 122 in the plate 98.

The alternated poles of the circular magnet 104 are distributed (circularly) about the axis of rotation of the disk 112, the magnetic field (completed by the ferromagnetic plate 98) traversing the disk. The assembly of the magnet 104, the non-magnetic conducting disk 112, and the ferromagnetic plate 98 constitutes a highly efficient and economical construction for an eddy-current brake determining the speed of motion of the shutter under the urging of the constant-force spring.

The illustrated construction incorporates a novel, extremely reliable, yet simple and inexpensive means for varying the retarding torque, and thus the speed of the speed of the shutter. Mounted on a carrier 124 and reciprocable in the small gap between the magnet 104 and the rotating disk 112 is a flat ferromagnetic plate 126 having a longitudinally extending handle portion 128 and a control or body portion 130. The control portion 130 has a curved outer edge 132 shaped in a manner to be further discussed below; the plate 126 shunts or diverts a portion of the field of the magnet, shielding the disk from the portion of the magnet covered by the plate. The handle portion 128 is seated in a longitudinal recess 134 in the underside of the shunt carrier 124, which is of inverted U-shaped cross section, and is secured thereto by mating apertures 136 in the handle and bosses 138 formed on the carrier. A raised slide 140 formed on the lower portion of the base seats the carrier 124. The carrier is movable on the slide by means of a tab 142 accessible to the user through an overlying rectangular slot 144 in a recessed portion 146 of the lower portion of the cover 22; the tab 142 is engaged by the ends of the slot 144 to limit sliding of the carrier 124 to positions therebetween. On the cover adjacent to the slot 144 is a calibrated scale 148 for indication of shutter speed, the desired speed being obtained, as will be explained below, by positioning of the index portion 150 of the carrier at the desired speed marking 152 on the scale.

The carrier 124 may be selectively positioned by the user (employing the scale 148, calibrated in terms of desired speed) between a position of maximum shunting (illustrated in FIGURE 2) and a position of minimum or zero shunting, which correspond, respectively, to maximum and minimum shutter speeds. Insertion of the shunt control area 130 into the space between the magnet 104 and the rotating disk 112 completes the magnetic flux path otherwise including the portion of the disk thus covered, reducing the area of the magnetic flux (between the plate 98 and the magnet) through which the disk rotates, and accordingly reducing the retarding torque. By increasing and decreasing the area of the magnet covered by the shunt plate, the speed of the shutter is adjusted.

In the position of minimum shunting of the magnetic field, and thus minimum speed, the control portion 130 may be completely withdrawn and the entire disk 112 exposed to the field between the magnet 104 and the plate 98; however, as will be more fully explained below, it is desirable that, when positioned for maximum shunting, the control plate still leave a portion of the disk exposed to the field of the magnet, thus maintaining a minimum controlled braking torque which is substantially greater than the gear friction, etc., thus retaining reliability of calibration at the highest speeds.

There are a number of important considerations in connection with the construction of the magnetic shunt. As will be observed in the drawing, the illustrated shunt is not a mere plate of conventional shape, but is of a shaped experimentally found to produce a desirable calibration characteristic of shutter speed as a function of shunt position. The shaping of the shunt for the production of a desirable characteristic of speed as a function of position is a matter requiring reasonable care, as will be apparent from consideration of the theoretical factors involved, together with the illustration in FIGURE 8 of a desirable calibration characteristic curve and, in dotted form, various forms of undesirable curves which may be avoided by certain principles of construction found in accordance with the present invention.

Obviously, it is possible to use, for example, a rectangular plate reciprocable between positions wherein the disk is fully covered and fully uncovered, respectively. For reasons which will be briefly discussed, such a structure is, for many purposes, completely unsuitable, and, in any event, is far inferior to a shunt shaped in accordance with the principles constituting an additional feature of the present invention. The factors which are important in this respect are best seen by consideration of the problems experimentally found to exist, together with certain more or less qualitative considerations of the theory of operation of such a shunt which demonstrate the difficulty of reaching optimum design by mere computation, but at the same time show the principles to be observed in the simple experimentation required for producing the desirable characteristic with any given "geometry" of the magnetic field.

As in any eddy-current device, the retarding force varies with the speed, so that the speed reached at any given setting of the shunt is the speed at which the torque exercised by the driving force (here the constant-force spring and the gear system) is essentially balanced by the counter-torque developed in the eddy-current brake. Where speed variation is accomplished by variation of the intensity of a magnetic field, with distribution unchanged, the manner in which speed varies with such intensity may be calculated from well-known principles of eddy-current brake operation, and is roughly independent of the particular field pattern, etc., used. However, where, as in the present invention, the variation is accomplished by selective masking or shielding of parts of the rotating conductor by a shunt, the exact distribution of the magnetic field will obviously greatly affect the shape of the speed characteristic obtained with any given shape of movable shunt. Furthermore, even with a completely uniform magnetic field, calculation or prediction of the exact shape of the curve of speed as a function of shunt position is made extremely difficult by the fact that for any given rotational speed the linear speed of any given portion of the disk is proportional to the radial distance from the axis, so that calculation of the effect of advancement or withdrawal of a shunt of any given shape between any two positions is impractical, let alone point-by-point calculation of an entire curve of speed as a function of shunt position. Accordingly, for any given magnetic field distribution, the desirable shaping of the shunt must be made the subject of simple experimentation, the direction of such experimentation for any given shape of magnetic flux field being determinable from the basic features discussed below.

Figure 8:
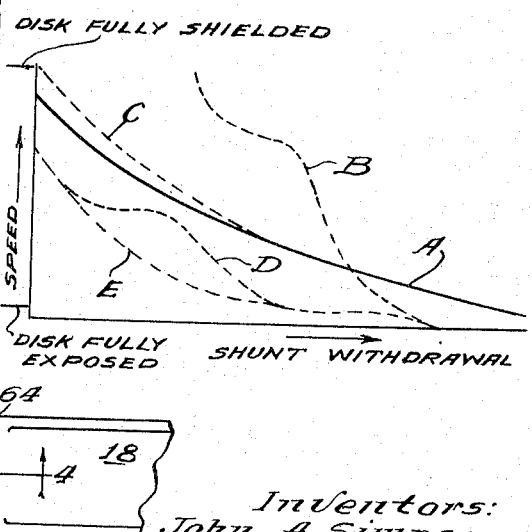
FIGURE 8 is a diagrammatic graph showing speed as a function of adjustment of the speed-regulating assembly, along with dotted showings of speed characteristics obtained with modified forms of the speed-regulating assembly.

In FIGURE 8, there is shown at A, a desirable form of characteristic of speed as a function of shunt withdrawal. Less desirable characteristics are of the general shapes illustrated by curves B through D, which typify various kinds of less desirable speed characteristic curves obtained with various shapes and sizes of shunt plates.

Obviously, in the absence of substantial-sized apertures, hook-shaped projections, or similar complications, any shape of shunt will produce a speed which is a monotonic function of position and, with sufficient size, and sufficient length of stroke, will vary the speed from a maximum value, shown by the legend "Disk Fully Shielded" in FIGURE 8 to a minimum speed shown by "Disk Fully Exposed." For example, there is shown at B a curve of a general shape which may be obtained with, for example, a large rectangular shunt, moved to cover and uncover the disk in a direction perpendicular to the edge of the shunt. Such a shunt accomplishes its total speed variation in the range of motion corresponding to the diameter of the disk (or even smaller if the field configuration does not extend to the edge of the disk). Additionally, as may be seen from study of the effects of distance from the center as regards effectiveness of any given area in braking action, the curve produced by such a shape is not smooth, but has one or more "humps," normally of a magnitude completely unacceptable for use as a calibrated speed control.

By shaping the shunt with the forward edge tilted or curved with respect to the direction of motion, the length of stroke of the shunt which is effective in producing the speed variation is increased to any desired extent. The advantages of such extension may readily be seen. Restriction of a calibration scale to the diameter of a relatively small brake disk is highly undesirable, since both reading and accurate setting by a user are made extremely difficult, unless there are introduced complications such as gearing or similar motion multiplication between the shunt and the operating member manipulated in making adjustment. Further, the employment of the longer shunt structure makes precision in manufacture, etc., much less critical in obtaining uniformity of calibration in devices as manufactured. The employment of a shunt having at least a portion of its leading edge tapered, so that the field through the disk is varied in the region of operation wherein the leading edge is substantially beyond the edge of the disk in the position of maximum shielding of the field, extends the operating stroke and, additionally, permits shaping for the production of the desired smooth calibration curve. Adjustment of the slope or pitch of the taper permits the use of any desired length of simple linear motion of the shunt to cover the operating range.

Curve C of FIGURE 8 has the desired long operating region, but extends to full shielding of the disk, thus producing the maximum speed of which the mechanism is inherently capable. The objection to this type of operation is that the calibration in the high-speed region cannot be reasonably controlled in manufacturing operations, since the speed in this region is largely determined by gearing friction and similar variables which it is relatively difficult to maintain uniform in a device of reasonable cost. Accordingly, it is desirable that the innermost or high-speed position of the shunt still leave exposed sufficient area of the disk to produce in the brake a retarding torque substantially greater than the torque resistance of the mechanism by which the brake is coupled to the drive.

Curve D shows a type of characteristic which may be obtained with a structure having, for example, a long straight tapered edge, without any curvature. As will there be seen, one or more irregularities of the calibration curve may be produced by the relative insensitivity of speed to exposure of area in the center of the disk, and regions of motion which, for a particular shape, produce primarily, or solely, changes of exposed central area, will demonstrate relatively negligible speed change. such irregularities may be eliminated by curves, notches, etc., by which a shape found to produce such insensitive regions may be modified, to produce, for example, the more-or-less logarithmic characteristic of curve E (although for purposes of such reading-training devices as here involved, a more linear characteristic, shown at A, is generally desirable).

As earlier indicated, the particular shunt shape shown in the drawing was found desirable with a magnetic field configuration more or less annular in shape, formed by alternated opposite poles circularly disposed on the round ceramic magnet. This specific shape will, of course, not be the most suitable for other field shapes, such as a horseshoe or bar magnet, but the principles of construction discussed above will readily be applied to any particular field shape desired. Obviously, some configurations, together with desired curve shape, may be found to produce the best overall results with one or more small or minor oscillations (change of sign of second derivative) in the calibration curve. However, for purposes of a practical speed control, there should be no substantial region in which the second derivative of the speed as a function of shunt withdrawal distance is negative.

An additional feature of the present invention is the provision of a friction coupling between the pulley gear 80 and the rubber upper spool 90. The spring fastener 92, which urges the rubber spool 90 against the surface of the gear wheel 82, is selected to produce a friction force at the interface which is greater than the maximum braking force, but less than the normal manual force which is employed in manually urging the shutter downwardly, and which is of a magnitude substantially greater than that of the braking force. The friction coupling thus designed maintains slip-free rotation of the spool and gear when the shutter is free of external load, but permits desired slippage when the shutter is under sufficient external load, as when it is manually urged downwardly by the user. Such friction coupling permits the user to by-pass material on a page (e.g., illustrations) simply by rapidly moving the shutter to the desired position, the shutter immediately regaining its preset speed upon release, substantially without transient effects and, due to the slippage, without injury to the interconnected gears. Inasmuch as rapid by-passing is so commonly employed by users of reading-training machines, the friction coupling described herein not only makes such by-passing easy, but also prevents damage to the gears and braking mechanism which would otherwise result in machines employing a rigid coupling.

Many modifications and alterations of the invention, far different both in appearance and details of construction from the embodiments herein illustrated but nevertheless utilizing the basic teachings of the invention, will be readily apparent to persons skilled in the art. Accordingly, the scope of the protection to be afforded the invention should not be limited by the particular embodiments illustrated and described, but should be determined from the description of the essential features of the invention which appear in the appended claims, and equivalents thereof.

We claim:
1. A variable drive mechanism comprising, in combination:
 (a) a housing,
 (b) means mounted on the housing for exerting a constant drive force,
 (c) an eddy-current brake comprising a non-magnetic conducting member rotatably mounted on the housing and coupled to the force-exerting means and means for producing a magnetic field through the rotative path of the conducting member,
 (d) and means to vary the retarding force exerted by the magnetic field comprising adjusting means movable on the housing in a plane transverse to the magnetic field to vary the area and shape of the magnetic field penetrating the conducting member.

2. The drive mechanism of claim 1 wherein the adjusting means comprises a ferromagnetic shunt reciprocable in the region adjacent to the rotative path of the conducting member.

3. A variable constant-speed drive mechanism comprising:
 (a) an elongated housing,
 (b) spools at opposite ends of the housing,
 (c) an elongated tension assembly having end portions wound on the spools and an intermediate drive portion, and having constant-force spring means urging the tension assembly in the direction to unwind the tension assembly on one spool and wind it on the other,
 (d) an eddy-current brake in the region between the spools adjacent to one of the spools and a speed-reducing gear train coupling the brake to said spool,
 (e) the brake comprising a rotatably mounted circular conducting member, a magnet closely adjacent to one side of the conducting member but spaced therefrom, and a ferromagnetic flux-return member on the opposite side of the conducting member, the magnet and flux-return member producing a magnetic field of generally circular symmetry,
 (f) a longitudinally extending track on the housing in the region between the brake and the other spool,
 (g) a slider mounted for motion on the track and having a manually operable indexing portion, the housing having a speed-calibration scale adjacent to the indexing portion,
 (h) a ferromagnetic shunt on the end of the slider reciprocable in the space between the magnet and the conducting member to shield the latter from variable portions of the field,
 (i) means for limiting the motion of the shunt to advanced and withdrawn positions substantially more distant than the dimension of the conducting member in the direction of motion of the shunt,
 (j) the shunt being tapered in the dimension transverse to its motion and to the field,
 (k) the conducting member being at least partially exposed to the magnetic field in all positions of the shunt so that the braking force is at all times primarily due to eddy-currents, the shunt having its advance end extending substantially beyond the conducting member in its advanced position and leaving the conducting member substantially unshielded in its withdrawn position, (1) the variation of speed with withdrawal of the shunt being free of any substantial region wherein the second derivative is negative.

4. A variable constant-speed drive mechanism for pacing reading comprising:
   (a) a vertically elongated housing adapted to be placed adjacent to reading material,
   (b) means on the housing to exert a constant downward driving force,
   (c) an eddy-current brake coupled to the force-exerting means,
   (d) the brake comprising a rotatably mounted conducting disk, a magnet closely adjacent to one side of the disk but spaced therefrom, and a ferromagnetic flux-return plate on the opposite side of the disk, the magnet and plate producing a magnetic field of generally circular symmetry,
   (e) a vertically extending track on the housing,
   (f) a slider mounted for motion on the track and having a manually operable indexing portion, the housing having a speed-calibration scale adjacent to the indexing portion,
   (g) a ferromagnetic shunt plate on the upper end of the slider and reciprocable in the space between the magnet and the disk to shield the disk from variable portions of the field,
   (h) means for limiting the motion of the shunt plate to upper and lower positions substantially more distant than the diameter of the disk,
   (i) the shunt plate being tapered in transverse dimension,
   (j) the disk being at least partially exposed to the magnetic field in all positions of the shunt plate so that the braking force is at all times primarily due to eddy-currents, the shunt plate having its upper end extending substantially above the disk in its upper position and leaving the disk substantially unshielded in its lower position,
   (k) the variation of speed with downward motion of the shunt being free of any substantial region wherein the second derivative is negative.

5. A variable constant-speed drive mechanism comprising:
   (a) a housing,
   (b) means on the housing to exert a constant driving force,
   (c) an eddy-current brake coupled to the force-exerting means,
   (d) the brake comprising a rotatably mounted conducting member and means for producing a magnetic field through the rotational path of the conducting member,
   (e) a ferromagnetic shunt member reciprocable in the magnetic field to shield the conducting member from variable portions of the field,
   (f) and means for limiting the motion of the shunt member to advanced and withdrawn positions,
   (g) the shunt member being tapered in the dimension transverse to the motion.

6. A variable constant-speed drive mechanism comprising:
   (a) a housing,
   (b) means on the housing to exert a constant driving force,
   (c) an eddy-current brake coupled to the force-exerting means,
   (d) the brake comprising a rotatably mounted conducting disk, a magnet closely adjacent to one side of the disk but spaced therefrom, and a ferromagnetic flux-return plate on the opposite side of the disk, the magnet and plate producing a magnetic field of generally circular symmetry,
   (e) a track on the housing,
   (f) a slider mounted for motion on the track and having a manually operable indexing portion, the housing having a speed-calibration scale adjacent to the indexing portion,
   (g) a ferromagnetic shunt plate on the end of the slider reciprocable in the space between the magnet and the disk to shield the disk from variable portions of the field,
   (h) means for limiting the motion of the shunt plate to advanced and withdrawn positions substantially more distant than the diameter of the disk,
   (i) the shunt plate being tapered in transverse dimension,
   (j) the disk being at least partially exposed to the magnetic field in all positions of the shunt plate so that the braking force is at all times primarily due to eddy-currents, the shunt plate having its upper end extending substantially beyond the disk in its advanced position and leaving the disk substantially unshielded in its withdrawn position,
   (k) the variation of speed with withdrawal of the shunt being free of any substantial region wherein the second derivative is negative.

7. A variable constant-speed drive mechanism for pacing of reading comprising:
   (a) a vertically elongated housing adapted to be placed adjacent to reading material,
   (b) spools at the top and bottom of the housing,
   (c) an elongated tension assembly extending along one side of the housing and having end portions wound on the spools and an intermediate portion adapted to drive a line-indicator and having constant-force spring means urging the tension assembly downwardly,
   (d) an eddy-current brake downwardly adjacent to the upper spool and a speed-reducing gear train coupling the brake to said spool,
   (e) the brake comprising a rotatably mounted conducting disk, a magnet closely adjacent to one side of the disk but spaced therefrom, and a ferromagnetic flux-return plate on the opposite side of the disk, the magnet and plate producing a magnetic field of generally circular symmetry,
   (f) a vertically extending track on the housing in the region between the brake and the lower spool,
   (g) a slider mounted for motion on the track and having a manually operable indexing portion, the housing having a speed-calibration scale adjacent to the indexing portion,
   (h) a ferromagnetic shunt plate on the upper end of the slider and reciprocable in the space between the magnet and the disk to shield the disk from variable portions of the field,
   (i) means for limiting the motion of the shunt plate to upper and lower positions substantially more distant than the diameter of the disk,
   (j) the shunt plate being tapered in transverse dimension,
   (k) the disk being at least partially exposed to the magnetic field in all positions of the shunt plate so that the braking force is at all times primarily due to eddy-currents, the shunt plate having its upper end extending substantially above the disk in its upper position and leaving the disk substantially unshielded in its lower position,
   (l) the variation of speed with downward motion of the shunt being free of any substantial region wherein the second derivative is negative.

References Cited by the Examiner
UNITED STATES PATENTS 2,919,500  1/1960  Simpson et al. _____ 35—35.2

EUGENE R. CAPOZIO, *Primary Examiner.*

W. GRIEB, *Assistant Examiner.*